United States Patent
Richardson et al.

(10) Patent No.: US 8,307,419 B2
(45) Date of Patent: *Nov. 6, 2012

(54) SYSTEM AND METHOD FOR REGULATING COMMUNICATIONS TO OR FROM AN APPLICATION

(75) Inventors: John W. Richardson, Portland, OR (US); David A. Chouinard, Tigard, OR (US); Karen Chouinard, legal representative, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,668

(22) Filed: Nov. 12, 2010
(Under 37 CFR 1.47)

(65) Prior Publication Data
US 2011/0119751 A1    May 19, 2011

Related U.S. Application Data

(63) Continuation of application No. 10/778,099, filed on Feb. 17, 2004, now Pat. No. 7,836,494, which is a continuation of application No. 09/473,971, filed on Dec. 29, 1999, now abandoned.

(51) Int. Cl.
*H04L 29/06* (2006.01)
(52) U.S. Cl. .............. 726/11; 726/2; 726/12; 726/13; 726/14; 713/153; 713/154; 709/238; 709/239; 709/240; 709/241; 709/225
(58) Field of Classification Search .............. None
See application file for complete search history.

(56) References Cited

U.S. PATENT DOCUMENTS

| | | | | |
|---|---|---|---|---|
| 5,586,260 | A | * | 12/1996 | Hu ................................ 726/12 |
| 5,826,014 | A | | 10/1998 | Coley et al. |
| 5,835,726 | A | * | 11/1998 | Shwed et al. ............... 709/229 |
| 5,872,847 | A | * | 2/1999 | Boyle et al. ................. 713/151 |
| 5,903,732 | A | | 5/1999 | Reed et al. |
| 5,968,176 | A | * | 10/1999 | Nessett et al. ............... 726/11 |
| 6,141,755 | A | * | 10/2000 | Dowd et al. ................. 726/11 |
| 6,199,113 | B1 | * | 3/2001 | Alegre et al. ............... 709/229 |
| 6,212,558 | B1 | | 4/2001 | Antur et al. |
| 6,304,973 | B1 | * | 10/2001 | Williams ...................... 726/3 |

(Continued)

OTHER PUBLICATIONS

Tuan Phan, Zhijun He, Thu D. Nguyen, "Using Firewalls to Enforce Enterprise-wide Policies over Standard Client-Server Interactions", Department of Computer Science, Rutgers University, New Brunswick, USA, Proceedings of the 24th IEEE Symposium on Reliable Distributed Systems (SRDS), Orlando, USA, Oct. 2005; Copyright 2006 Academy Publisher, Journal of Computers, vol. 1, No. 1, Apr. 2006, pp. 1-13.

*Primary Examiner* — Syed A. Zia
(74) *Attorney, Agent, or Firm* — Kenyon & Kenyon LLP

(57) ABSTRACT

The flow of information to or from an application on a host machine is regulated by a trusted agent operating in conjunction with at least one security element, such as a firewall or a policy server. When a communication to or from the application is detected by the trusted agent, the trusted agent gathers information about the attempted communication, and formulates and sends a message based upon the gathered information to at least one security element. The security element makes a decision to permit or block at least part of the attempted communication based upon the message received from the trusted agent.

24 Claims, 2 Drawing Sheets

U.S. PATENT DOCUMENTS

| | | | |
|---|---|---|---|
| 6,321,337 B1 * | 11/2001 | Reshef et al. | 726/14 |
| 6,772,334 B1 * | 8/2004 | Glawitsch | 713/153 |
| 6,799,177 B1 * | 9/2004 | Fai et al. | 1/1 |
| 7,076,650 B1 * | 7/2006 | Sonnenberg | 713/151 |
| 7,127,741 B2 * | 10/2006 | Bandini et al. | 726/14 |
| 7,197,766 B1 * | 3/2007 | Ræstad et al. | 726/14 |
| 7,606,854 B2 * | 10/2009 | Ellis, III | 709/201 |
| 7,640,346 B2 * | 12/2009 | Ottaviani et al. | 709/227 |
| 7,743,158 B2 * | 6/2010 | Fu et al. | 709/229 |
| 7,827,602 B2 * | 11/2010 | Aaron | 726/13 |
| 7,836,494 B2 * | 11/2010 | Richardson et al. | 726/11 |
| 7,865,939 B2 * | 1/2011 | Schuster | 726/4 |
| 7,877,409 B2 * | 1/2011 | Lim | 707/781 |
| 8,103,585 B2 * | 1/2012 | Bishop et al. | 705/40 |
| 8,127,345 B2 * | 2/2012 | Gregg et al. | 726/7 |
| 8,156,246 B2 * | 4/2012 | Short et al. | 709/239 |
| 8,209,373 B2 * | 6/2012 | Ellis, III | 709/201 |
| 2003/0120955 A1 * | 6/2003 | Bartal et al. | 713/201 |
| 2006/0168654 A1 * | 7/2006 | Jennings et al. | 726/11 |
| 2007/0058645 A1 * | 3/2007 | Nannra et al. | 370/401 |
| 2007/0067837 A1 * | 3/2007 | Schuster | 726/11 |
| 2011/0271339 A1 * | 11/2011 | Ellis | 726/12 |
| 2012/0042387 A1 * | 2/2012 | Howard et al. | 726/26 |

* cited by examiner

SYSTEM AND METHOD FOR REGULATING COMMUNICATIONS TO OR FROM AN APPLICATION

RELATED APPLICATIONS

This application is a continuation of patent application Ser. No. 10/778,099 filed on Feb. 17, 2004, which will issue on Nov. 16, 2010 as U.S. Pat. No. 7,836,494, which claims the benefit of priority to patent application Ser. No. 09/473,971, filed on Dec. 29, 1999(abandoned).

BACKGROUND OF THE INVENTION

The field of this invention is information systems security, and in particular the regulation of the flow of information to or from a host coupled to a network.

Known firewalls regulate the flow of information by acting as an intermediary between two entities that desire to communicate with each other. Known firewalls typically fall into one or more of the following categories: a packet-header firewall; a proxy firewall and an authentication firewall.

The known packet-header firewall operates on packetized information, where each packet includes a source address, a source port, a destination address, a destination port, a communications protocol identifier (collectively known as "header information") and a payload. This type of firewall stores a list of rules that specify that a given packet is to be permitted to PASS through the firewall to its intended destination based upon its header information, or else the packet must be blocked (i.e., a DROP or delete action must be performed on the packet.) For example, a rule may state that all packets of the Transmission Control Protocol ("TCP", see RFC 793, Transmission Control Protocol, Defense Advanced Research Projects Agency, September 1981, from Source Address 102.23.132.4, Source Port 40 to Destination Address 193.2.24.32, Destination Port 41 are allowed to PASS. Another rule may state that all packets from any Source Address, Source Port 80 to any Destination Address, any Destination Port must be DROPPED.

The known packet-header firewall disadvantageously cannot detect and block packets that have the correct header information, but that are being sent by a malicious program. Such a malicious program can include a computer virus or Trojan horse in the payload of the packet or packets that the firewall allows to PASS. Another disadvantage of using header information rules is that this technique cannot prevent a trusted person from sending confidential and/or proprietary information through the firewall. This is because such information is in the payload, which is not examined by this known type of firewall. Further, an application that is configured to create and send packets that the firewall permits to PASS can be maliciously altered to circumvent the rules of the firewall so that illicit information can be sent and received in spite of the controls implemented by the firewall. For example, a firewall rule that prohibits the transfer of files, but allows the sending of e-mail, can be circumvented by sending files through a pseudo-e-mail application that superficially uses an e-mail protocol. In this way, confidential and proprietary files may be sent surreptitiously without being detected and blocked by the firewall.

Known firewalls that base a PASS or DROP decision upon header information alone can be of limited usefulness, because the security policy by which the firewall operates dictates that data be PASSed or DROPped based upon information not available in the header information. For example, some frequently used applications, such as the File Transfer Protocol and H.323 can negotiate different port numbers for communicating on a session-by-session basis. This disadvantage is mitigated by known proxy firewalls. A known proxy firewall examines the contents (the payload) of a packet (and not just its header information) to obtain further information about the nature of an attempted communication. The proxy firewall can therefore make a decision to PASS or DROP a packet based upon more information than just the header information. But investigating the content of each packet can quickly overwhelm a firewall through which a substantial amount of traffic flows.

The third type of known firewall is the authentication firewall. The authentication firewall only permits information to PASS if the firewall can properly authenticate the sender of the information. An example of this type of firewall is the SOCKS system described in RFC 1928, SOCKS Protocol Version 5; RFC 1929, Username/Password Authentication for SOCKS V5, March 1996; and RFC 1961, GSS-API Authentication Method for SOCKS Version 5, June 1996; and the SOCKS5 product by NEC Systems, Inc. of San Jose, Calif. For example, when a sender from inside the known authentication firewall (e.g., on an internal network, such as an intranet) wishes to send information to an entity on the outside of the authentication firewall (e.g., to an entity on an external network, such as the Internet), the sender must first authenticate itself to the firewall. In one example, the sender must enter and send the correct user identifier and secret password to the firewall. In another example, the sender must insert a secure token (e.g., a secure smart card) that sends information to the firewall, and then must enter his secret personal identification number ("PIN"), which is also sent to the firewall. The firewall only permits communications between the sender and the external entity after it is satisfied that the user is authenticated, i.e., that the user is in fact who he purports to be. This type of firewall advantageously need not examine the contents of each packet it receives, but disadvantageously provides no protection against malicious acts by a trusted insider. For example, a trusted individual inside the firewall can maliciously authenticate himself to the firewall only to transfer confidential and proprietary files without authorization to an entity on the external network, through the firewall.

Known firewall systems are thus forced to tradeoff efficiency for the ability to implement a more detailed security policy across a full range of protocols and applications. No centralized firewall system can fully embody both of these desirable properties.

SUMMARY OF THE INVENTION

An embodiment of the present invention includes a system and method for regulating communications to or from a first application executing on a host machine. An attempt to communicate to or from the first application is detected. Trusted information about the attempted communication is determined, and a message is sent to at least one security element based upon the determined trusted information about the attempted communication.

DETAILED DESCRIPTION

Figure 1:
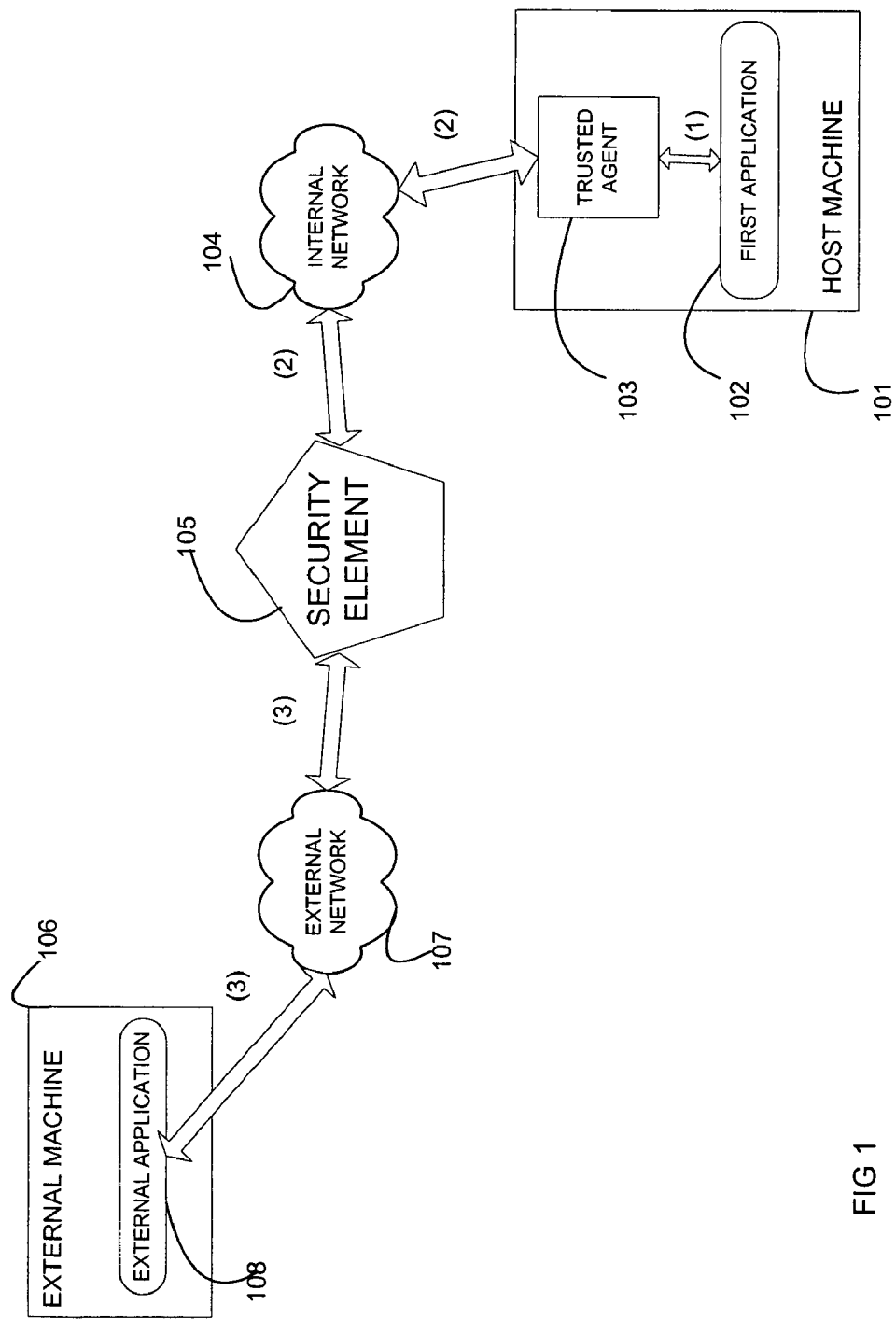
FIG. 1 is a system in accordance with an embodiment of the present invention.

In accordance with an embodiment of the present invention, a host machine executing a trusted agent is coupled to an external network (e.g., the Internet). As used herein, a "trusted agent" is software that is trusted by the system security administrator to perform its functions properly. Measures can be applied to the trusted agent to assure that it performs its intended functions completely, correctly and exactly. An examples of such an assurance measure includes the implementation of tamper-resistant features in the trusted agent and/or in the hardware that stores and/or executes the trusted agent, as known in the art. See, e.g., U.S. Pat. No. 5,892,899, Tamper Resistant Methods and Apparatus, issued Apr. 6, 1999 to Aucsmith et al., and assigned to the Intel Corporation of Santa Clara, Calif. In one embodiment, the trusted agent is a trusted kernel in the operating system of the host machine. In another embodiment, the trusted agent is a trusted application or utility executing (e.g., in the network stack) on the host machine. For example, by executing in the network stack of the host machine, the trusted agent is advantageously positioned to regulate communications to and/or from an application executing on the host machine.

When the trusted agent detects that a communication to or from an application (other than the trusted agent) is executing on the host machine, the trusted agent analyzes the application, and generates information useful to a firewall in making a PASS or DROP decision with respect to packets flowing from or to the application. This information is then sent to the firewall, which uses it to implement the system security policy. In this way, an embodiment of the present invention advantageously distributes some of the work that would otherwise have to be done by the firewall to the endpoints (e.g., the work is done by trusted agents on host machines) to support the firewall in efficiently making an informed, accurate and reliable decision about whether to PASS or DROP a packet to or from the application. In one embodiment, the application executing on the host machine (the "first application") attempts to communicate with another application (an "external application") executing on another machine external to the host machine. For example, the external machine executing the external application can be a peer of the host machine, a client, a server, an appliance (e.g., a personal digital assistant), etc., that is coupled to the host machine, e.g., through a network.

In the above example, the trusted agent communicates with a firewall. This is meant to illustrate, and not limit, the scope of the present invention. In another embodiment of the present invention. the trusted agent makes an autonomous decision about whether to permit the communication to or from the application to take place. For example, the trusted agent consults an access list (stored locally, or stored remotely and communicated with over a secure channel) which correlates permissions with particular applications (e.g., application A can receive communications from an application of type B, and send and receive communications from an application C). The trusted agent can also receive a credential from the application executing on the host and/or the external application with which the host application seeks to communicate. The trusted agent can autonomously decide whether to permit the communication by verifying the credential or credentials of the applications seeking to communicate. If the credentials can be verified, then the communication is permitted; otherwise it is not.

In another embodiment, the decision-making process for permitting the sought communication is shared between the trusted agent and an external (e.g., outside of the external to the host machine) security element. The external security element can include a firewall, as discussed above, a proxy server, a policy server, a plurality and/or combination thereof, etc., or any external server to the host machine. In accordance with an embodiment of the present invention, the external "security element" includes any resource capable of participating in a process for deciding if a communication should be permitted. In one embodiment, the functions of enforcing a permission and deciding the permission are advantageously separated. Enforcement demands efficient performance, whereas decision-making demands intelligence, two qualities that are not always compatible within a single element. In particular, the enforcement of a permission is performed by a firewall between the host application and the external application. The decision-making is performed by a policy server coupled to the firewall (e.g., through a network). This decision-making can be supported by information obtained by the trusted agent and communicated with the policy server and/or the firewall. The policy server embodies the intelligence to render an access decision (a permission for communication) based upon a complex set of rules, i.e., a security policy that can be stated at a higher level than is stated in certain firewalls. The firewall implements simpler rules communicated from the policy server, e.g., PASS or DROP actions that are prescribed based upon header information.

In one embodiment that need not even implicate a firewall, the analysis performed by the trusted agent is to authenticate the application and determine if the authenticated application belongs to a set of "approved applications." If the authenticated application belongs to the set of approved applications, then the communication is permitted. Otherwise, the communication is blocked. In another embodiment, the trusted agent determines state information (e.g., the configuration) of the application and/or of the host machine and sends it to the firewall, which bases its PASS or DROP decision upon the state information.

The trusted agent can authenticate the application by calculating a message digest based upon at least part of the code that comprises the application. The message digest can be calculated using any suitable hashing algorithm, such as the MD5 algorithm known in the art. See Bruce Schneier, *Applied Cryptography*, John Wiley & sons, 1996, Chapter 18 (pp. 429-459). The trusted agent can sign the message digest as known in the art. See Bruce Schneier, *Applied Cryptography*, John Wiley & sons, 1996, Chapter 18 (pp. 483-502). In another embodiment, the trusted agent authenticates the application by detecting and verifying a watermark steganographically embedded (hidden in a way known to the trusted agent, but not generally known) in the source code of the application. Or the trusted agent can request, receive and verify an authenticating certificate from the application. These and other techniques are employed by technologies known in the art, such as the Authenticode system developed by the Microsoft Corporation of Seattle, Wash. Another known technology that can be suitable for this purpose is the signed manifest system developed by the Intel Corporation of Santa Clara, Calif.

The trusted agent can determine if the authenticated application belongs to a set of approved applications by examining a list of approved applications. In one embodiment, the list is stored securely on the host machine, e.g., in an encrypted form accessible only to the trusted agent. In another embodiment, the list is stored on a server (or firewall) coupled to the host machine through a network. The trusted agent sends a message to the server or firewall that includes an identifier of the authenticated application (e.g., the message digest of the authenticated application, an authenticated application serial number, etc.) The server or firewall then determines if its stored list of approved applications includes an identifier that corresponds with the authenticated identifier received from the trusted agent. If the server/firewall list includes a corresponding approved application identifier, then the server/firewall sends a message back to the trusted agent indicating that the authenticated application is an approved application. If the authenticated application does not have a corresponding identifier on the approved applications list stored at the server or firewall, the server/firewall sends the trusted agent a message indicating that the authenticated application is not an approved application. In this example, the server/firewall can be a policy server.

The trusted agent can authenticate the application and then send other information (besides the authenticated application identifier described above) to a firewall. For example, the trusted agent can obtain and send information about the identity of the user utilizing the application; the identity of the user or users logged on at or through the host machine; the identities of other applications being executed and/or stored at the host machine; an identifier embedded in packets to indicate that they are related, such as an Internet Protocol Version 6 ("Ipv6," see RFC 1752, The Recommendation for the IP Next Generation Protocol, January 1995, and RFC 1883, Internet Protocol, Version 6 (Ipv6) Specification, December 1995, flow identifier or a circuit identifier; etc. The trusted agent can also obtain and send information such as the Security Parameter Index, which is used to associate security information with a given communication or set of communications (called a "context"). The Security Parameter Index is described in RFC 2401, Security Architecture for the Internet Protocol, November 1998. The firewall advantageously uses the information sent by the trusted agent to make a PASS or DROP decision on packets without having to perform the analysis itself to obtain the same information.

For example, the trusted agent can authenticate and sign every packet when it is received from the application, and then send each packet to the firewall. The firewall can then implement a simplified rule to PASS any packet that has been signed by the trusted agent, and to DROP any packet that is not signed by the trusted agent. This transfers the burden of authenticating each packet from the firewall to the trusted agent running on the host machine, thereby permitting the firewall to handle more traffic.

In another embodiment, the firewall and the trusted agent engage in two-way communication to implement the system security policy. For example, the trusted agent sends a message to the firewall that an application that is already sending traffic through the firewall is opening another channel (flow) of information with a remote endpoint. The firewall sends back a query to the trusted agent asking for specific information (e.g., negotiated port numbers, the type of information to be carried on the new channel (voice, video, text, etc.)), a flow or circuit identifier for the new flow of information, etc. The trusted agent obtains this information from the application, or from elsewhere, and sends it in response to the firewall. In one embodiment, the firewall can send a command to the trusted agent to block the attempted communication at the host machine, to close the application, to send a warning message to the user, etc.

A system in accordance with an embodiment of the present invention is shown in FIG. 1. Host machine 101 executes first application 102 and trusted agent 103. Host machine 101 is coupled to internal network 104, which is coupled to a security element 105 (e.g., a firewall). Internal network 104 can be a corporate local area network ("LAN"), an intranet, a virtual private network, etc. Security element 105 is coupled to external machine 106 through external network 107. External network 106 can be another corporate LAN, virtual private network, intranet, the Internet, etc. External machine 107 executes external application 108.

In the embodiment shown in FIG. 1, a communication attempt between first application 102 and external application 108 is detected (1) by the trusted agent 103. The communication can be initiated by either the first application 102 or the external application 108. The trusted agent gathers information about the attempted communication (such as the identity of the first application, its state information, etc.) (1). A message (2) is sent from the trusted agent 103 through the internal network 104 to the security element 105. This security information is used by the security element 105 to determine if the attempted communication is permissible. In one embodiment, the security element 105 sends a message to the trusted element 103, instructing the trusted agent 103 to disallow the communication. The trusted agent blocks the attempted communication. In another embodiment, the security element 105 receives communications from the first application 102, and selectively PASSes or DROPs communications between the first application 102 and the external application 108 based upon the information received (2) received from the trusted agent 103.

Figure 2:
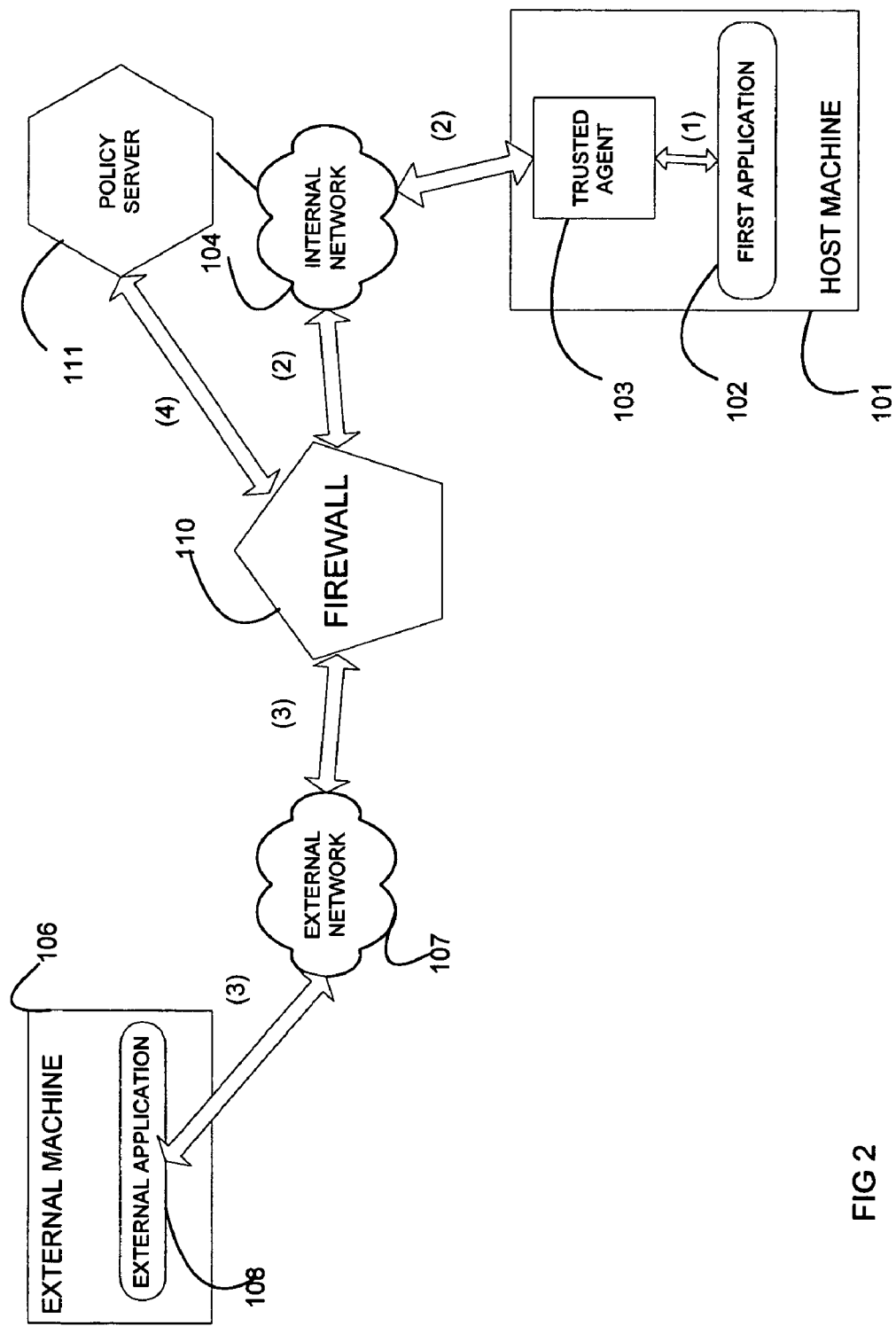
FIG. 2 is a system in accordance with another embodiment of the present invention.

FIG. 2 shows an embodiment that is similar to that shown in FIG. 1, except that the security element 105 of FIG. 1 is specifically a firewall 110 in FIG. 2. The embodiment shown in FIG. 2 also includes a policy server 111. The policy server 111 communicates (4) with the firewall 110. Communications (4) between the policy server 111 and the firewall 110 are shown in FIG. 2 to be direct (e.g., by direct connection), but can also be conducted through either internal network 104 or external network 107. Policy server 111 can also communicate through internal network 104 with trusted agent 103.

In accordance with an embodiment of the present invention, the host machine includes a processor coupled to memory. The processor can be a general purpose microprocessor, such as a Pentium III® microprocessor manufactured by the Intel Corporation of Santa Clara, Calif. The processor can also be an Application Specific Integrated Circuit ("ASIC") that at least partly embodies the method in accordance with the present invention in its hardware and/or firmware. An example of an ASIC is a digital signal processor. The processor can include both a general purpose microprocessor and an ASIC.

Memory is any device adapted to store digital information, such as Random Access Memory (RAM), Read Only Memory (ROM), flash memory, a hard disk, etc. At least part of the memory should be writeable, as well as readable. The non-transitory memory stores instructions adapted to be executed by the processor to perform the method in accordance with an embodiment of the present invention. In one embodiment, the instructions are adapted to be executed by the processor to detect an attempted communication between a first application and an external application, gather information about the attempted communication, and then to formulate and send a message about the attempted communication to a security element. In another embodiment, the instructions are adapted to receive information from a trusted agent about an attempted communication between a first application and an external application, and to use this information to make a security decision pertaining to the information. The instructions can be adapted to send a message to the trusted agent that tells the trusted agent how to regulate the communication between the first application and the external application. For example, the message sent from the security element to the trusted agent can instruct the trusted agent to completely block the attempted communication. Alternatively, the message can include more detailed instructions about how the trusted agent is to regulate the communication. For example, if the first application seeks to communicate audio and video (moving picture) with the external application, the message from the security element can instruct the trusted agent to permit the communication of audio information, but to not permit the communication of video information.

In another embodiment, the security element can use the information received from the trusted agent to make an enforcement decision. That is, the PASS or DROP decision is enforced by the security element. The security element that receives the information from the trusted agent can be a security decision-maker, such as a policy agent. The policy agent then formulates a security decision with respect to the attempted communication, and sends the decision to a security enforcement point other than the trusted agent, e.g., to a firewall. The firewall then enforces the decision made by the policy agent, which was informed by the trusted agent. In yet another embodiment, the security element sends a message based upon the information received about the intended communication to the first application and/or to the external application to permit or block at least a part of the attempted communication.

The use of a trusted agent in accordance with an embodiment of the present invention advantageously at least partly distributes the task of implementing a system security policy to the endpoints, e.g., to the host machines that execute the applications that are the ultimate source and/or destination of communications regulated by a firewall. By obtaining and sharing information about an attempted communication with a firewall, a trusted agent obtains information that is either unavailable to the firewall, or else burdensome for the firewall to obtain. By simplifying the task of the firewall, the firewall can more efficiently handle more traffic. By obtaining information about the application, higher resolution security policies can be more accurately enforced than with known firewalls. This is partly because the data upon which packet-header and proxy firewalls base PASS and DROP decisions can be easily spoofed. Further, there are many situations where the data upon which known firewalls base PASS or DROP decisions (such as header information) does not map well to a security policy. The present invention is more resistant to spoofing than known firewalls, and advantageously bridges the existing gap between the presently limited information upon which known firewalls must base their decisions, and the more fulsome information needed to make accurate PASS or DROP decisions that comport with a rich security policy. The present invention can advantageously more completely and accurately implement a richer detailed security policy across a full range of protocols and applications in an efficient and flexible manner.

What is claimed is:

1. A method for regulating communications to or from a first application executing on a host machine, including:
    executing a trusted agent on the same host as the first application, wherein the trusted agent is to enforce a security policy;
    detecting with the trusted agent an attempt to communicate to or from the first application;
    determining with the trusted agent trusted information about the attempted communication; and
    sending from the trusted agent a message to at least one security element based upon the determined trusted information about the attempted communication.

2. The method of claim 1, wherein determining trusted information about the attempted communication includes determining at least one from the group of: the identity of the first application; the identity of the host machine; the identity of a second application at the host machine; the identity of a user employing the application; a port number to which the communication is to be assigned; state information about the first application; and the type of information to be conveyed in the communication.

3. The method of claim 1, wherein a security element includes one from the group of: a firewall, a proxy server and a policy server.

4. The method of claim 1, further including deciding at the host machine if the attempted communication is permitted.

5. The method of claim 4, wherein deciding if the attempted communication is permitted includes consulting an access control list.

6. The method of claim 4, wherein deciding if the attempted communication is permitted includes verifying a credential received from an application that is attempting to communicate.

7. The method of claim 1, wherein information about the application is determined by the trusted agent and sent to a policy server, and further including:
    determining at the policy server if the communication is permitted based upon the information received from the trusted agent; and
    sending a message from the policy server to a firewall through which the communication to or from the application must pass, wherein the message instructs the firewall to permit or block the communication.

8. The method of claim 1, wherein information about the application is determined by the trusted agent and sent to a policy server, and further including:
    determining at the policy server if the communication is permitted based upon the information received from the trusted agent; and
    sending a message from the policy server to the trusted agent, wherein the message instructs the trusted agent to permit or block the communication.

9. A system for regulating communications to or from a first application executing on a host machine, including:
    a trusted agent executing on the host machine, wherein said trusted agent is to enforce a security policy, detects an attempt to communicate to or from the first application, and obtains information about the attempted communication to or from the first application; and
    a security element that receives information about the attempted communication from the trusted agent, and determines if the attempted communication is to be permitted based upon the received information.

10. The system of claim 9, wherein the security element includes one of the group of: a firewall, a proxy server and a policy server.

11. The system of claim 9, wherein the information received by the security element about the first application includes one of the group of: an identifier of the first application; an identifier of a second application stored at the host machine; an identifier of the host machine; an identifier of a user of the first application; a port number to which the attempted communication is intended to be assigned; state information about the first application; and the type of information meant to be conveyed by the attempted communication.

12. A non-transitory medium storing instructions adapted to be executed by a processor to perform steps including:
    executing a trusted agent on a host machine, wherein a first application is executed on the same host machine and the trusted agent is to enforce a security policy;
    detecting with the trusted agent an attempt to communicate between the first application and an external application;

determining with the trusted agent information about the attempted communication; and sending from the trusted agent a message to at least one security element, wherein the contents of the message are based upon the information determined about the attempted communication.

13. The non-transitory medium of claim 12, wherein the instructions are adapted to be executed by a processor in a trusted environment.

14. The non-transitory medium of claim 12, wherein the instructions are tamper-resistant.

15. The non-transitory medium of claim 12, wherein the information determined about the attempted communication includes at least one from the group of:

information useful for identifying the first application; information useful for identifying the external application; information useful for identifying a second application executing on the host machine; information useful for identifying the host machine; a user identifier; a port number to which the communication is intended to be assigned; information about the state of the first application; information about the state of the second application; and the type of information to be conveyed by the communication between the first application and the external application.

16. The non-transitory medium of claim 12, wherein the security element includes one from the group of: a firewall, a proxy server and a security policy server.

17. A method for regulating communications between a first application executing on a host machine and an external application executing on an external machine, including:

executing a trusted agent on the same host as the first application, wherein the trusted agent is to enforce a security policy;

detecting with the trusted agent an attempt to communicate between the first application and the external application;

receiving from the trusted agent information about the attempted communication between the first application and the external application;

making a security decision with respect to the attempted communication based upon the information received about the attempted communication; and performing a security action with respect to the attempted communication.

18. The method of claim 17, wherein making the security decision includes determining if the attempted communication is to be permitted.

19. The method of claim 17, wherein the security action includes permitting at least part of the attempted communication.

20. The method of claim 17, wherein the security action includes blocking at least part of the attempted communication.

21. The method of claim 17, wherein the security action includes sending a message to the trusted agent to permit or block at least part of the attempted communication.

22. The method of claim 17, wherein the security action includes sending a message to a firewall to permit or block at least part of the attempted communication.

23. The method of claim 17, wherein the security action includes sending a message to the first application to permit or block at least part of the attempted communication.

24. The method of claim 17, wherein the security action includes sending a message to the external application to permit or block at least part of the attempted communication.

* * * * *